United States Patent [19]

Toye et al.

[11] Patent Number: 5,400,677
[45] Date of Patent: Mar. 28, 1995

[54] SHIELD FOR ENGRAVING MACHINES

[75] Inventors: Neville D. Toye, Clarksburg; Alfred G. Denault, North Adams, both of Mass.

[73] Assignee: Excelsior Process and Engraving, Inc., North Adams, Mass.

[21] Appl. No.: 144,418

[22] Filed: Nov. 2, 1993

[51] Int. Cl.⁶ .......................... F16P 1/00; B30B 15/00
[52] U.S. Cl. ......................................... 74/615; 100/53; 192/134
[58] Field of Search .................. 74/615, 613; 192/130, 192/134; 100/53

[56] References Cited

U.S. PATENT DOCUMENTS

| | | | |
|---|---|---|---|
| 1,733,227 | 10/1929 | Jones | 74/615 |
| 2,199,743 | 5/1940 | Eickman | 74/615 |
| 2,296,068 | 9/1942 | Swanson | 74/615 |
| 2,338,364 | 1/1944 | Sundstrom | 74/615 |
| 3,186,256 | 6/1965 | Reznick . | |
| 3,913,413 | 10/1975 | Walker . | |
| 3,996,815 | 12/1976 | Walker . | |
| 4,033,250 | 7/1977 | Pinkstaff . | |
| 4,037,699 | 7/1977 | Cronen, Jr. . | |
| 4,179,987 | 12/1979 | Dohm, Jr. . | |
| 4,220,032 | 9/1980 | Smith, Jr. . | |
| 4,307,798 | 12/1981 | Watanabe . | |
| 4,488,630 | 12/1984 | Plumb . | |
| 4,527,684 | 7/1985 | Eggeman et al. . | |
| 4,583,629 | 4/1986 | White . | |

*Primary Examiner*—Rodney H. Bonck
*Attorney, Agent, or Firm*—Richard H. Kosakowski

[57] ABSTRACT

A shield for an engraving machine or the like is disclosed that prevents the machine operator from placing his or her fingers in the work area of the machine while the ram of the machine is traveling toward the work area. The shield includes a faceplate that is attached to a slide and slide holder configuration. The slide holder is attached to the machine, while the slide is adapted to travel with the slide holder. A plunger holder is affixed to the ram, while a plunger is spring loaded to travel within the plunger holder. As the ram travels upward away from the work area, a protrusion on the plunger interacts with the slide to force the slide and faceplate in an upward direction as well, thereby clearing the work area and allowing access thereto by the machine operator. The faceplate moves upward in unison with the ram until the plunger interfaces with the slide holder, at which time the plunger disengages from the slide. The faceplate then is lowered by gravity and by a spring covering a piston back down to cover the work area in preparation for the next descent of the ram.

20 Claims, 4 Drawing Sheets

SHIELD FOR ENGRAVING MACHINES

BACKGROUND OF THE INVENTION

The present invention relates to safety devices for power-driven machinery, and more particularly, to a shield for an engraving machine or the like that prohibits the dangerous placement of fingers in the work area of the machine during its operation.

Engraving machines are well-known devices used to stamp or engrave a desired pattern in a piece of material. An engraving machine typically comprises a vertically moving ram carrying a male die. The ram and corresponding die are moveable downward toward a female die mounted on a fixed bed of the machine. A piece of material, such as paper, is placed over the female die by a human operator. The operator then activates the ram and the male die travels vertically downward toward the female die and stamps or engraves the piece of material with a desired symbolic formation, such as letters or numbers. The area at the interface between the male and female dies is termed the "work area" or "break".

After stamping the material, the ram moves vertically upward, thereby moving the male die out of the work area. This allows the machine operator to remove the work piece and insert a new work piece into the work area. The speed of vertical reciprocating movement of the ram, and the amount of time between its movements, can be automatically and adjustably set by the machine operator. Such movements of the ram are always triggered by a clutch arm, which frees the hands of the machine operator to properly position the work piece in the work area.

An inherent problem with engraving machines is that the human operator can inadvertently have his or her fingers in the work area as the vertically moving ram is traveling downward toward the work area. Because these die-stamping engraving machines have existed for decades, history is replete with human operators having fingers mangled or severed by such powerful machinery.

As a result, various shielding devices have been developed to attempt to protect the machine operator from injury. A moveable shield is used to protect the work area from the hands of the operator. The shield is typically operable between an open position in which the operator can access the work area, to a closed position in which it is desirable that it be impossible for the operator the access the work area. The shield must be in front of the work area when in its closed position and offer a small clearance for feeding the work piece over the female die. Yet, at the same time, the shield must protect against the placement of the operator's fingers into the work area when the ram is descending.

It is known in the prior art of shields for engraving machines or the like to utilize various means for moving the shield between the open and closed positions. Such shields are operated pneumatically or hydraulically by the operator activating, for example, a foot pedal. Alternately, the shields may have their movements automatically controlled. It is also known in the prior art to sense when the operator's hands are within the work area and prevent ram movement.

Reznick U.S. Pat. No. 3,186,256 discloses a safety shield comprising two vertical panel sections, the lower section being hinged. The upper section is attached to either an armature of a solenoid or a piston rod. The armature has an associated solenoid, while the piston has a control valve. The panel sections rise up when the press comes down to allow the work piece to bend. When the press is up, the shield is down to restrict access to the contact area of the die portions of the press. Other representative prior shields for engraving or die stamping machines are disclosed in U.S. Pat. Nos. 4,220,032; 3,996,815; 4,488,630; and 4,037,699.

However, in spite of these and other well-known prior art shields, operator injuries have still occurred due to, for example, mechanical or electrical malfunctions, or to intentional or accidental bypassing by the operator of the functioning of the shield. Such malfunctions occur because known prior art shields employ elaborate electrical and/or mechanical schemes for sensing various positions of the shield and the ram and for moving the shield in response thereto.

Heretofore, no known scheme has been implemented wherein movement of the ram directly causes corresponding movement of the shield.

Accordingly, it is a primary object of the present invention to provide a shield for an engraving machine or the like that prevents the machine operator from placing his or her fingers within the work area of the machine during machine operation that could harm the operator.

It is a general object of the present invention to provide a shield for an engraving machine that is moveable away from the work area in response to movement of the ram portion of the machine.

It is another object of the present invention to provide a shield for an engraving machine that is simple in construction and that is easily retrofitted onto existing engraving machines.

The above and other objects and advantages of the present invention will become more readily apparent when the following description is read in conjunction with the accompanying drawings.

SUMMARY OF THE INVENTION

To overcome the deficiencies of the prior art and to achieve the objects listed above, the Applicants have invented a shield for an engraving machine that prevents the machine operator from placing his or her fingers in the work area of the machine while the ram portion of the machine is travelling toward the work area. The shield is moveable away from the work area by movement of the ram away from the work area.

In the preferred embodiment of the shield of the present invention, the shield comprises a clear acrylic faceplate that is attached to a slide and slide holder configuration. The slide holder is affixed to a stationary part of the engraving machine. The slide is adapted to travel within the slide holder. Also attached to the slide is a piston of an air cylinder. Attached to the ram, which is the vertically moving portion of the engraving machine, is a plunger and plunger holder configuration. The plunger holder is affixed to the ram, while the plunger is spring loaded to travel within the plunger holder.

In operation of the engraving machine, the ram has a male die attached to a work surface of the ram. The ram travels vertically downward until it interfaces with a female die attached to the stationary bed of the engraving machine. The interface of the two dies is the work area of the engraving machine. The work product (e.g., paper) to be engraved is placed between the male and female dies such that, when the two dies come together, the desired pattern is engraved or embossed into the work product. The ram then reverses direction and travels vertically upwards to a position where it stops. This clears the work area, allowing the machine operator to remove the engraved work product from the work area and place the next work product to be engraved therein.

As the ram travels upward away from the work area, a protrusion on the plunger interacts with the slide to force the slide (and, thus, the faceplate and piston) in an upward direction as well, thereby clearing the work area and allowing access thereto by the machine operator. The faceplate moves upward in unison with the ram until an angled surface on the plunger interfaces with a beveled surface on the slide holder. The beveled surface forces the plunger into the plunger holder, overcoming the force of the spring. This causes the protrusion on the plunger to disengage from the slot in the slide. The ram continues on its upward stroke away from the work area. However, the faceplate, together with the slide and piston, are now lowered by gravity, and by the force of a spring surrounding the piston, back down to cover the work area in preparation for the next descent of the ram. The rate of descent of the faceplate can be governed by a throttle valve, which controls the rate of escape of air from the air cylinder.

BRIEF DESCRIPTION OF THE DRAWINGS

FIG. 5 is a side view, partially cut away, of a portion of the shield of FIG. 1, illustrating the plunger in a first position;

FIG. 6 is a side view, partially cut away, of the shield of FIG. 1, illustrating the plunger in a second position;

FIG. 7 is a cross sectional view of the shield of FIG. 1, taken along the lines 7—7 of FIG. 5; and FIG. 8 is a cross sectional view of a portion of the shield of FIG. 1, taken along the lines 8—8 of FIG. 6.

DETAILED DESCRIPTION OF THE PREFERRED EMBODIMENTS

Figure 1:
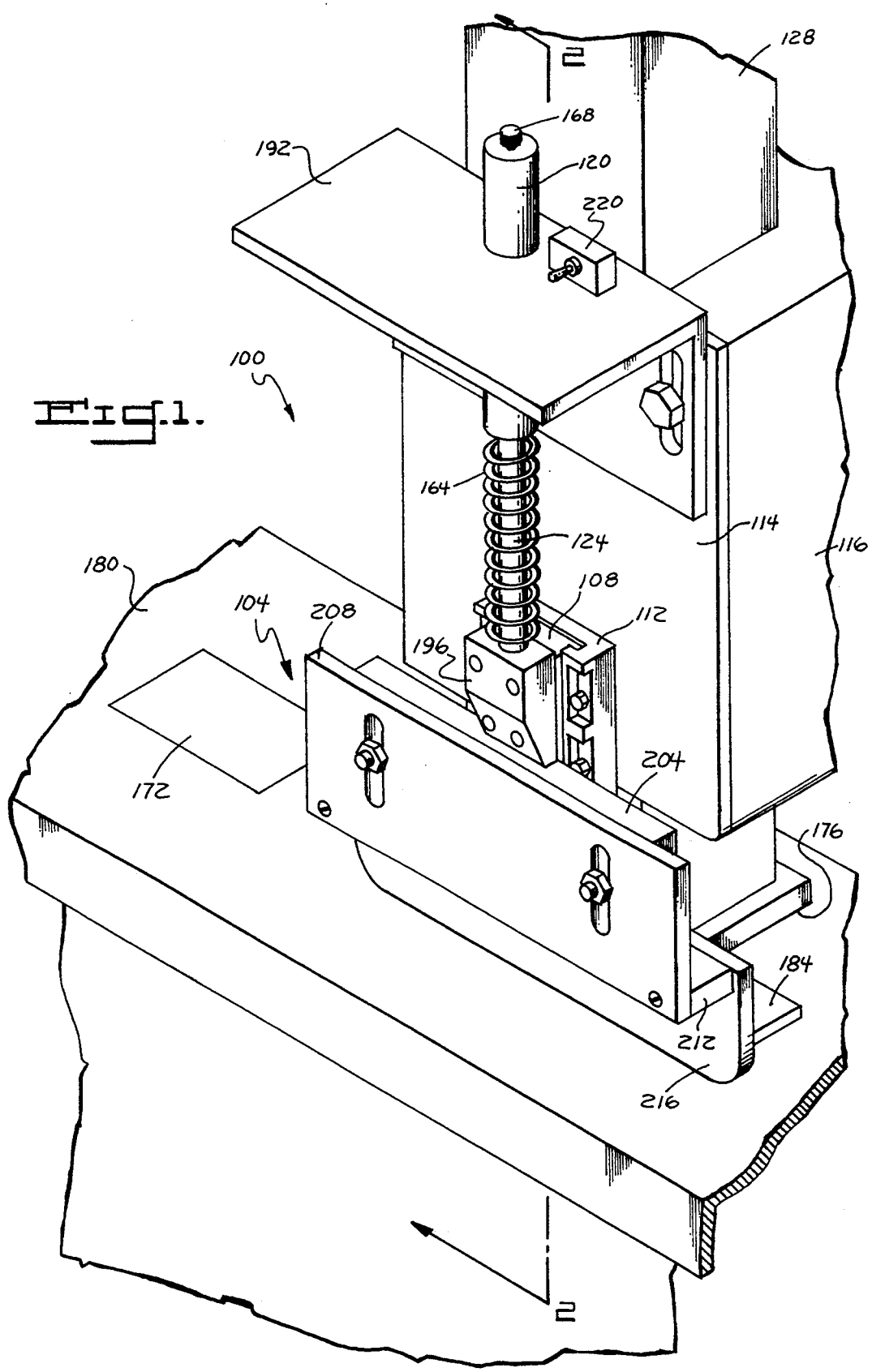
FIG. 1 is a perspective view of an engraving machine having the shield of the present invention mounted thereto.

Referring to the drawings in detail, safety shield apparatus for an engraving machine is generally illustrated and designated by the reference numeral 100. The shield 100 comprises a transparent faceplate 104 attached to a slide 108 and slide holder 112. The slide holder 112 is affixed to a stationary part 114 of the engraving machine 116, while the slide 108 travels within the slide holder 112. Attached to the stationary part 114 of the machine 116 is an air cylinder 120 having a piston 124 connected to the slide 108. The ram 128, or vertically moving part of the machine 116, has a plunger holder 132 attached thereto. A plunger 136 is spring loaded within the plunger holder 132 and has a protrusion 140 that rides in a slot 144 formed in the slide 108. As the ram 128 travels vertically upward, the plunger protrusion 140 forces the faceplate 104 in an upward direction as well. The faceplate 104 moves upward in unison with the ram 128 until an angled surface 148 on the plunger 136 interfaces with a beveled surface 152 on the slide holder 112. The beveled surface 152 forces the plunger 136 into the plunger holder 132, overcoming the force of the spring 156. This causes the protrusion 140 on the plunger 136 to disengage from the slot 144 in the slide 108. The ram 128 then continues on its upward stroke away from the work area 160 of the machine 116. However, the faceplate 104, together with the slide 108 and piston 124, are lowered by gravity, and by the force of a spring 164 surrounding the piston 124, back down to cover the work area 160 in preparation for the next descending stroke of the ram 128. The rate of descent of the faceplate 104 can be governed by a throttle valve 168 that controls the rate of escape of air from the air cylinder 120.

Referring to FIG. 1, there illustrated in perspective is a typical engraving machine 116 used to emboss or engrave a desired pattern on a work product 172, such as a piece of paper. The engraving machine 116 comprises a stationary frame portion 114 and a vertically moving ram portion 128 adapted to travel therewithin. A male die 176 attaches to the bottom of the ram 128. The engraving machine 116 also includes a stationary work surface 180, which the machine operator uses to place and maneuver into position the work product 172. A female die 184 is disposed on a bed 188 of the engraving machine 116. The male and female dies 176, 184 typically are changeable plates that have the desired pattern to be engraved in the paper 172 formed therein. The female die 184 is positioned with respect to the male die 176 such that when the ram 128 travels to its farthest vertical point downward, the male die 176 physically interfaces with the female die 184 at the work area of the engraving machine 116.

Thus, the ram 128 is vertically moveable between a first position where the ram 128 is at its farthest vertical point downward, at which position the ram 128 interfaces with the bed 188 of the engraving machine 116. The second ram position is the farthest vertical upward position, where the work area 160 is typically exposed for access by the machine operator. This vertical reciprocal movement of the ram 128 between the two positions can be controlled either manually by the machine operator through a foot pedal (not shown), or automatically through appropriate control means (not shown). Without some type of safety shield 100, as that described herein according to the present invention, the work area 160 of the engraving machine 116 is dangerously accessible by the fingers of the machine operator. Any inadvertent initiation of ram movement by the machine operator, or a malfunction in the control system of the ram 128, could cause the ram 128 to descend unexpectedly while the machine operator's hands or fingers are in the work area 160. This could cause serious injury to the operator.

The safety shield 100 of the present invention obviates this danger by having its upward movement initiated and controlled by the ram 128 up to a certain vertical height at which the faceplate 104 then descends back down to cover the work area 160. The amount of time in which the faceplate 104 allows the work area 160 to be exposed can be controlled to allow the operator ample time to access the work area 160. Thus, there is never a danger of the machine operator having his or her fingers within the work area while the ram is descending downward thereto.

Referring now to all of the figures, the shield apparatus 100 of the present invention includes an angle bracket 192 bolted to the stationary frame part 114 of the engraving machine 116. The bracket 192 may comprise aluminum or other suitable material. Attached to the bracket is an air cylinder 120, which includes a piston 124 and spring 164 protruding from the cylinder 120 in a downward direction. The lower end of the piston 124 is inserted into an aluminum block 196 and held in place by a set screw 200.

A slide holder 112, comprised of tool steel or other suitable material, is screwed to the stationary part 114 of the machine 116. The slide holder 112 has a "T"-shaped channel or groove formed therein, as best seen in FIG. 7. A corresponding "T"-shaped slide 108 is provided that is operable to slide up and down within the corresponding "T"-shaped groove of the slide holder 112. The slide 108 may be made of bronze or other suitable material. The block 196 that attaches to the bottom of the piston 124 is attached to the upper part of the slide 108 by means of screws. Attached to the lower part of the slide by means of screws is a shield holder 204, made of aluminum.

An upper portion 208 of the faceplate 104 attaches to the shield holder 204. The upper faceplate portion 208 comprises a clear, durable acrylic material, such as that sold under the trademark LEXAN ®. The upper faceplate portion 208 has slotted holes formed therein to facilitate vertical positioning of the upper faceplate portion 208 with respect to the shield holder 204. Attached by way of screws to the bottom of the upper faceplate portion 208 is an aluminum spacer 212, which comprises a rectangular-shaped block. A lower faceplate portion 216 is attached to a back surface of the spacer 212. The lower faceplate portion 216 may also comprise the same clear acrylic material as that of the upper faceplate portion 208.

Thus, it is evident from the foregoing that as the piston 124 within the air cylinder 120 travels vertically up and down, the slide 108 and the faceplate 104 move up and down in unison therewith. The movement of the faceplate 104 is such that, when the faceplate 104 is in its lowermost position, the work area 160 of the engraving machine 116 is covered. This prevents the machine operator from inserting his or her fingers into the work area 160. There is a small vertical gap between the bottom of the lower faceplate portion 216 and the work surface 180 of the machine 116 such that the operator can maneuver the work product 172 into and out of position with respect to the work area 160. On the other hand, when the faceplate 104 is in its uppermost position, the machine operator now has clear access to the work area 160.

The piston 124 travels downward by the force of gravity, together with the force of the spring 164 surrounding the piston 124. The speed of piston travel is regulated by a throttle valve 168, which is a thumb screw attached to the top of the air cylinder 120. The throttle valve 168 regulates the exhausting of air from within the air cylinder 120 as the piston 124 moves downward. The shield 100 of the present invention also includes a toggle switch 220, which can "lock" the piston 124, and therefore the faceplate 104, in their uppermost positions.

Figure 2:
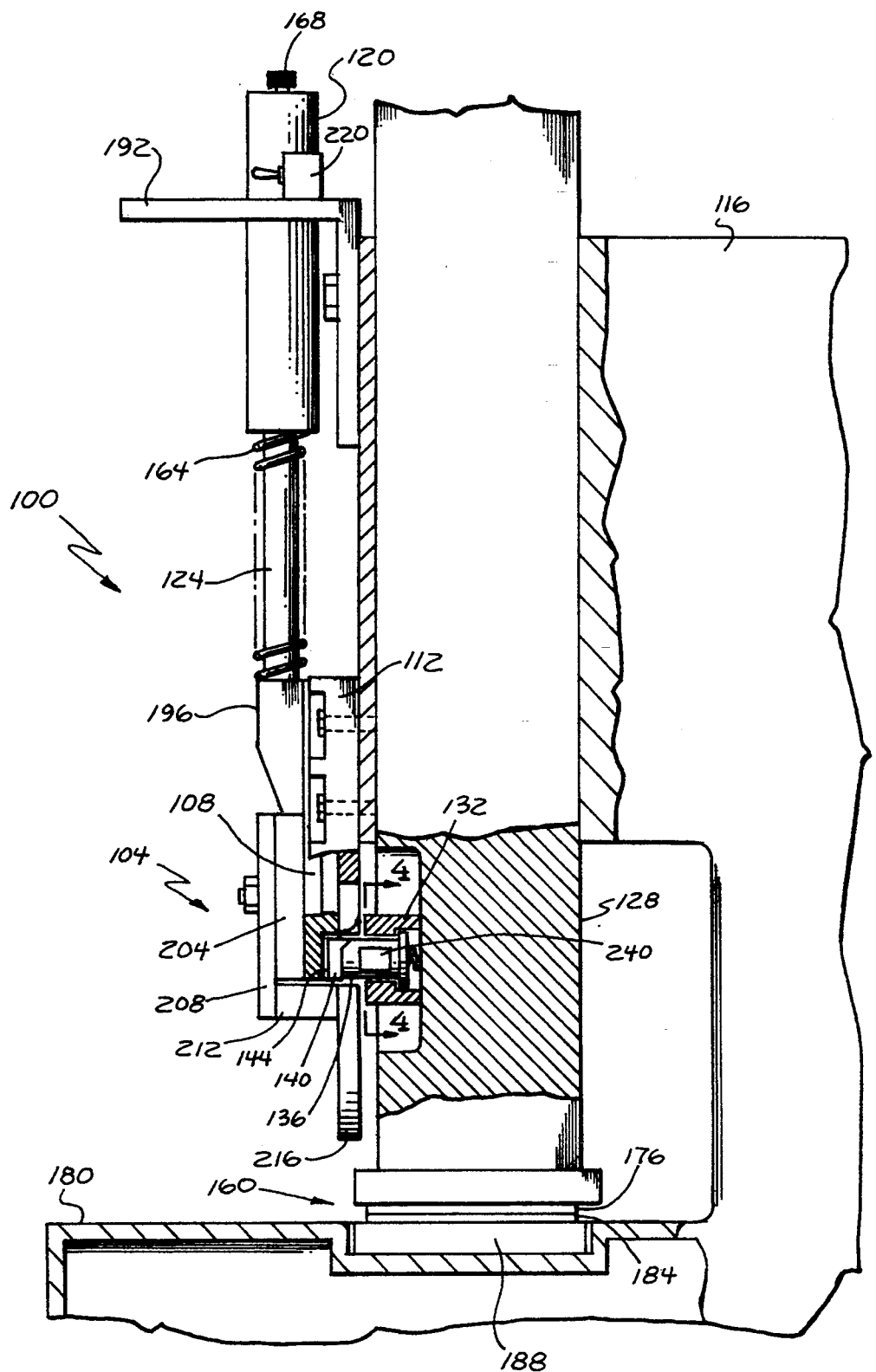
FIG. 2 is a side view, partially cut away, of the engraving machine with the shield of FIG. 1 mounted thereto.
Figure 3:
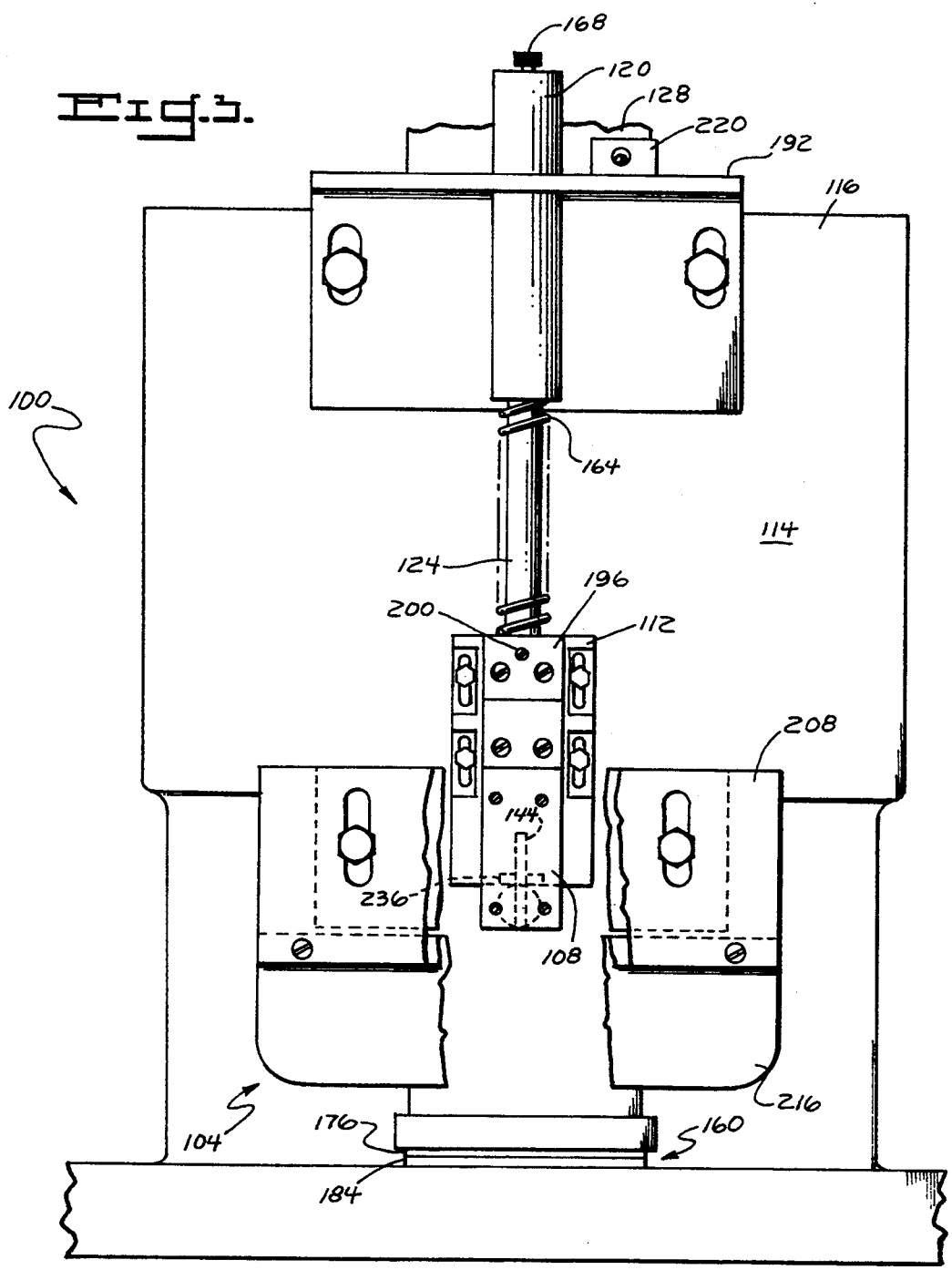
FIG. 3 is a front view, partially cut away, of the shield of FIG. 1.
Figure 4:
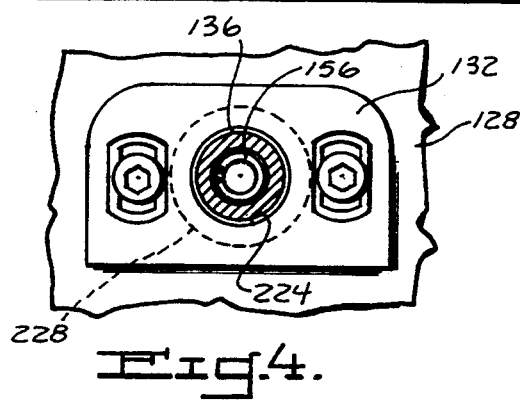
FIG. 4 is a cross sectional view of a portion of the shield of FIG. 1, taken along the lines 4—4 of FIG. 2.

The shield apparatus 100 of the present invention also comprises a plunger holder 132, made of tool steel or other suitable material, that is attached by screws to the ram 128. (See FIG. 4). The plunger holder 132 has a center throughbore 224 formed through its entire thickness. The throughbore 224 has a portion 228 that is of larger diameter and disposed closest to the surface of the ram 128 where the plunger holder 132 is secured. As best seen in FIGS. 2, 5, and 6, a plunger 136, also made of tool steel, is disposed within the throughbore 224 of the plunger holder 132 such that an outer ring or "lip" of the plunger 136 is constrained to travel only within the larger diameter portion 228 of the throughbore 224 of the plunger holder 132. The plunger 136 has an internal throughbore 232 formed through a portion of it. The plunger throughbore 232 accommodates a spring 156 inserted therewithin. The spring 156 is positioned between a surface of the ram 128 and the inner left edge of the plunger throughbore 232. The spring 156 acts to push the plunger 136 in a leftward direction out away from the surface of the ram 128.

The left end of the plunger 136 has a rectangular protrusion 140 oriented vertically. As illustrated in FIG. 5, with the faceplate 104 in a lowermost position, the spring 156 forces the plunger 136 toward its leftmost position. This causes the plunger protrusion 140 to engage a vertical slot 144 formed in the lower part of the slide 108. Thus, as the ram 128 moves vertically upward from the work area 160, the plunger protrusion 140 lifts the slide 108 upward in unison therewith. Such upward movement of the slide 108 also causes the faceplate 104 and piston 124 to be raised simultaneously as well, due to their aforementioned connection to the slide 108.

This upward movement of the faceplate 104 in unison with the ram 128 continues until an angled surface 148 on the plunger 136 strikes a beveled surface 152 on the lower part of the slide holder 112. At this point, the beveled 152 surface forces the plunger 136 inward toward the ram 136. This compresses the spring 156 between the ram 128 and the plunger 136. The plunger 136 is forced into the holder 132 such that the rectangular plunger protrusion 140 no longer interacts with the slot 144 formed in the slide 108. The force of gravity, along with the force of the spring 164 on the piston 124 now causes the faceplate 104 to descend vertically to its lowermost position. The throttle valve 168 adjustably regulates the rate of descent of the faceplate 104. At the same time, the plunger 136 continues to move vertically upward in unison with the plunger holder 132 and ram 128. A rectangular groove 236 is provided in the lower part of the slide holder 112. The plunger protrusion 140 is adapted to ride within this groove 236 until the ram 128 reaches its uppermost position.

To keep the cylindrical plunger 136 from rotating within the throughbore 224 in the plunger holder 132, the plunger 136 has a portion of its circumference formed as a plane 240. A small cylindrical hole 244 is formed vertically in the plunger holder 132, and a cylindrical pin 248 is inserted within the hole 244, as illustrated in FIG. 8. The pin 248 interacts with the planar side surface 240 of the plunger 136 to keep the plunger 136 from rotating within the holder 132.

The present invention has been described for use with engraving machines 116. However, it is to be understood that the shield 100 of the present invention may be used with other types of machinery where it is desired to prevent the machine operator from inserting his or her hands into a work area 160 of the machine 116. It suffice for the broadest scope of the present invention that the shield 100 employed with these other types of machines be operable in cooperation with the ram 128 or moveable portion of the machine.

The present invention has been described for use with a single piston 124. However, such description is purely exemplary; the present invention may integrate two or more pistons 124, if desired. It is anticipated that the number of pistons 124 used in alternative embodiments of the present invention is dictated by the size and weight of the faceplate 104 and slide/slide holder 108/112 configuration that the piston 124 is required to lower.

Also, the faceplate 104 has been described as comprising upper and lower portions 208, 216 connected by a spacer 212. However, such description is purely exemplary. The faceplate 104 may comprise a single piece of suitable material. Further, such faceplate material does not have to be clear or transparent. A transparent faceplate 104 is utilized in the exemplary embodiment of the present invention to allow the machine operator to view the work area 160 while the faceplate is in its lowermost position.

Still further, the shield apparatus 100 of the present invention can be setup such that the faceplate 104 begins its descent downward to cover the work area 160 either when the ram 128 has achieved only a portion of its vertical travel, or when the ram 128 has achieved its farthest position away from the work area 160.

It should be understood by those skilled in the art that obvious structural modifications can be made without departing from the spirit of the invention. Accordingly, reference should be made primarily to the accompanying claims rather than the foregoing specification to determine the scope of the invention.

Having thus described the invention, what is claimed is:

1. Safety apparatus for an engraving machine, the machine having a vertically reciprocating ram and stationary bed and frame portions, the ram interfacing with the bed at the vertically lowermost position of the ram in a work area of the engraving machine, such interfacing of the ram with the bed being operable to effectuate the engraving of a desired work product placed in the work area by the machine operator, the safety apparatus comprising:
   a. faceplate means operable to travel vertically between a lowermost position and an uppermost position, the faceplate means when in the lowermost position comprising means for preventing a hand of the machine operator from entering the work area when the ram is moving vertically downward toward the work area; and
   b. plunger means adapted to be fixedly attached to the ram and having protrusion means releasably engaged with the faceplate means, for moving the faceplate means vertically upward away from the work area in unison with the vertical upward movement of the ram and to a predetermined distance with the protrusion means attached to the faceplate means until the protrusion means disengages from the faceplate means, at which time of disengagement the faceplate means moves vertically downward to its lowermost position to cover the work area, the vertical downward movement of the faceplate means being independent of any vertical movement of the ram.

2. The safety apparatus of claim 1, wherein the faceplate means further comprises:
   a slide holder adapted to be attached to the stationary frame portion of the engraving machine and having a first surface at a lower edge thereof; and
   a slide attached to the faceplate means and adapted to travel within the slide holder, the slide having an opening formed therein.

3. The safety apparatus of claim 2, wherein the plunger means further comprises:
   a plunger holder adapted to be fixedly attached to the ram, the plunger holder having a first throughbore formed therein;
   a plunger adapted to travel within the first throughbore in the plunger holder; and
   a first spring disposed in the first throughbore of the plunger holder and operable to push the plunger away from the ram, the protrusion means being formed on the plunger and being operable to releasably engage the opening in the slide, the plunger further including an angled surface, wherein the plunger is operable to disengage from the opening in the slide when the angled surface of the plunger interfaces with the first surface of the slide holder upon the upward vertical movement of the ram away from the work area to the predetermined distance of the ram above the work area.

4. The safety apparatus of claim 3, wherein the plunger holder further includes retaining means for keeping the plunger from rotating in the first throughbore of the plunger holder.

5. The safety apparatus of claim 4, wherein the plunger has a planar side surface, and wherein the retaining means comprises a pin placed in a second throughbore of the plunger holder, the pin being in contact with the planar side surface of the plunger to prevent rotation of the plunger within the plunger holder.

6. The safety apparatus of claim 3, wherein the first surface of the slide holder is beveled.

7. The safety apparatus of claim 1, further comprising air cylinder means, attached to the faceplate means and including a piston, for controlling the vertical downward movement of the faceplate means to the lowermost position when the protrusion means disengages from the faceplate means.

8. The safety apparatus of claim 7, further comprising means for adjustably regulating the release of air from the air cylinder means to control the velocity of the vertical downward movement of the faceplate means.

9. The safety apparatus of claim 8, wherein the means for adjustably regulating the release of air from the air cylinder means comprises an adjustable throttle valve.

10. The safety apparatus of claim 7, wherein the air cylinder means further comprises a second spring, surrounding the piston, the second spring being compressed upon vertical upward movement of the faceplate means, the second spring being operable to control the vertical downward movement of the faceplate means to its lowermost position when the protrusion means disengages from the faceplate means.

11. The safety apparatus of claim 1, further comprising means for locking the faceplate means in a vertical position above the work area of the engraving machine such that the faceplate means remains stationary during any vertical upward and downward movement of the ram.

12. The safety apparatus of claim 1, wherein the faceplate means comprises a transparent material adapted to prevent insertion of the fingers of the machine operator into the work area.

13. A safety shield for a power machine having a reciprocating ram operable to travel between a work area of the machine and a position away from the work area of the machine, the safety shield comprising:

faceplate means operable to travel between a first position approximate the work area of the machine and a second position away from the work area of the machine, the faceplate means when in the first position comprising means for preventing a hand of the machine operator from entering the work area of the machine; and plunger means, adapted to be attached to the reciprocating ram, for releasably engaging with the faceplate means for moving the faceplate means in unison with the ram away from the work area until the ram reaches a predetermined position at which the plunger means disengages from the faceplate means and the faceplate means moves toward the work area, such movement of the face plate means after disengagement from the plunger means being independent of any movement of the ram.

14. The safety shield of claim 13, wherein the faceplate means further comprises:

a slide holder adapted to be attached to a stationary portion of the machine and having a first surface at a lower edge of the slide holder;

a slide, attached to the faceplate means and adapted to travel within the slide holder, the slide having an opening formed therein;

a plunger holder adapted to be fixedly attached to the ram, the plunger holder having a first throughbore formed therein;

a plunger adapted to travel within the first throughbore in the plunger holder; and a first spring disposed in the first throughbore of the plunger holder and operable to push the plunger away from the ram, the plunger being operable to releasably engage the opening in the slide, the plunger further including an angled surface, wherein the plunger is operable to disengage from the opening in the slide when the angled surface of the plunger interfaces with the first surface of the slide holder upon the movement of the ram away from the work area to the predetermined position of the ram away from the work area.

15. The safety shield of claim 14, wherein the plunger holder further includes retaining means for preventing the plunger from rotating in the first throughbore of the plunger holder.

16. The safety shield of claim 15, wherein the plunger has a planar side surface, and wherein the retaining means comprises a pin placed in a second throughbore of the plunger holder, the pin being in contact with the planar side surface of the plunger to prevent rotation of the plunger within the plunger holder.

17. The safety shield of claim 13, further comprising air cylinder means, attached to the faceplate means and including a piston, for controlling the movement of the faceplate means to its position approximate the work area when the plunger disengages from the slide.

18. The safety shield of claim 17, further comprising means for adjustably regulating the release of air from the air cylinder means to control the velocity of the vertical downward movement of the faceplate means toward the work area.

19. The safety shield of claim 18, wherein the means for adjustably regulating the release of air from the air cylinder means comprises an adjustable throttle valve.

20. The safety shield of claim 13, further comprising means for locking the faceplate means in a position away from the work area such that the faceplate means remains stationary during any movement of the ram.

* * * * *